No. 750,628. PATENTED JAN. 26, 1904.
I. H. FAY.
FRUIT FEEDER.
APPLICATION FILED AUG. 30, 1901.
NO MODEL.

WITNESSES:

INVENTOR
Irving H. Fay
BY James R. Rogers
ATTORNEY

No. 750,628. Patented January 26, 1904.

UNITED STATES PATENT OFFICE.

IRVING H. FAY, OF INDIO, CALIFORNIA, ASSIGNOR TO FRED STEBLER, OF RIVERSIDE, CALIFORNIA.

FRUIT-FEEDER.

SPECIFICATION forming part of Letters Patent No. 750,628, dated January 26, 1904.

Application filed August 30, 1901. Serial No. 73,882. (No model.)

*To all whom it may concern:*

Be it known that I, IRVING H. FAY, a citizen of the United States, residing at Indio, in the county of Riverside and State of California, have invented a new and useful Fruit-Feeder, of which the following is a specification.

This invention relates to apparatus for operating upon fruits; and some of the objects of the invention are to provide an apparatus constructed to feed or regulate the passage of fruits during the process of cleaning or grading or cutting the same; and some of the objects of the invention are to provide an apparatus of this general character which will be simple and cheap in construction and at the same time positive and effective in operation.

Another object of the invention is to provide a feeding device to regulate the passage of the fruit through the apparatus employed.

It is also an object of this invention to provide means for varying the speed of the feeding device; furthermore, to provide means for quickly stopping and starting the passage of fruit to the feeding device.

With these objects in view the invention consists, essentially, in the construction, combination, and arrangement of parts, substantially as hereinafter more fully described in the following specification, and illustrated in the accompanying drawings, forming part of this application, in which—

Figure 1:
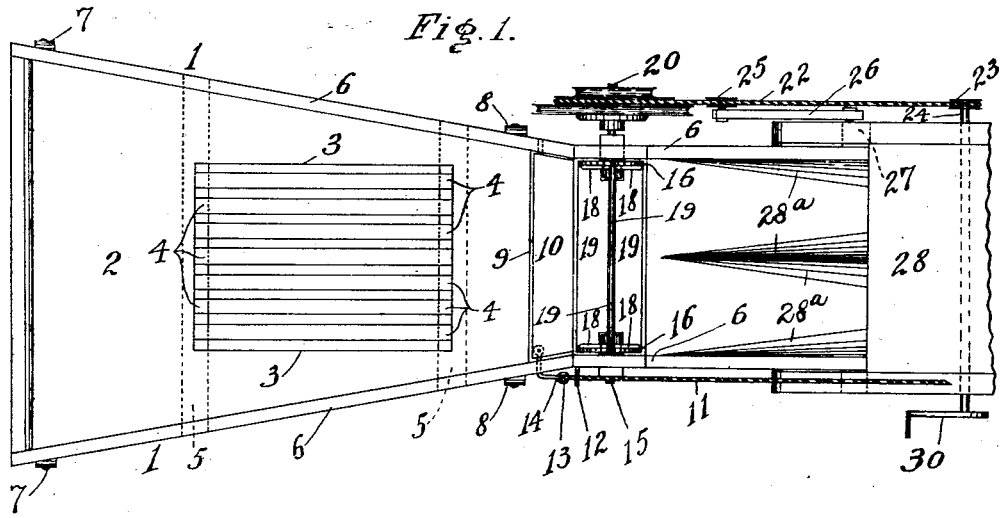
Figure 2:
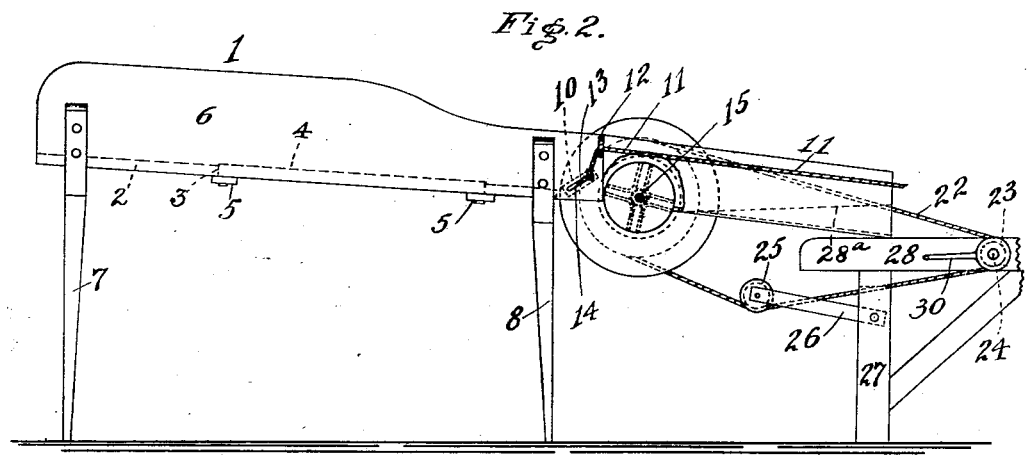
Figures 3, 4:
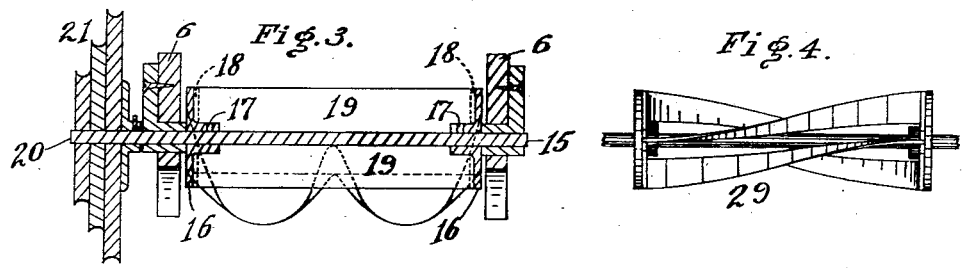

Figure 1 is a top plan view of an apparatus embodying my improvements. Fig. 2 is a side elevational view of the same, partly broken away. Fig. 3 is a longitudinal central section of the feeding device and part of the driving mechanism, and Fig. 4 is a modified form of feeding device.

Similar characters of reference designate corresponding parts throughout the several views.

Referring to the drawings, the invention is illustrated as applied to an ordinary construction of fruit apparatus; but it will be understood that the same is only typical of one form of apparatus to which the invention may be applied, as the invention is capable of use with any apparatus for brushing, cleaning, cutting, or grading fruit and for other purposes.

The construction here shown embodies a hopper or chuteway 1, having a bottom 2, preferably cut away, substantially as shown at 3, Fig. 1, to receive parallel bars or rods 4, which may be supported by transverse cleats 5, suitably secured to the bottom 2, substantially as shown. The hopper 1 is preferably provided with side pieces 6, secured to the converging edges thereof, and to the side pieces are attached legs or standards 7 and 8, the former being preferably longer than the latter in order to give a gravitating motion or movement to the fruit discharged upon the hopper or chuteway.

When the fruit passes over the bars or rods 4 in the bottom of the hopper or chuteway, the foreign matter or material—such as leaves, sticks, &c.—drops through the hopper between the bars or rods 4, as will be readily understood.

The bottom of the hopper is preferably cut away, substantially as shown at 9, Fig. 1, and in the cut-away portion is preferably pivotally mounted a gate or section 10, constructed to be operated preferably by a pull rope or chain 11, preferably passing through an eye 12 to a loop or ring 13 in the end of an angle bar or rod 14, secured to said gate, so that when the rope or chain 11 is pulled the gate will be elevated to close the throat of the hopper and prevent any more fruit from reaching the feeding device.

Mounted on a shaft 15, preferably journaled in bearings 15', inserted in the sides 6 of the hopper, are castings 16, desirably secured on said shaft by set-screws 17, and said castings are preferably provided with parallel lateral flanges or ribs 18, constructed to receive plates or wings 19, adapted to engage and pass the fruit on through the apparatus. By means of this construction the fruit is received and passed on slowly by the revolution of the feeding device, which may be provided with any number of feeding wings or blades 19 that may be found desirable in practice. Thus the operation of the apparatus will be regular and the rapidity of the passage of the fruit can be regulated.

Upon the extended end 20 of the shaft 15 is keyed or secured a cone-pulley 21 or other device, constructed to receive a belt or chain 22, passing over a pulley or sprocket-wheel 23, carried by a power-shaft 24, preferably mounted adjacent to the cone-pulley and driven by a crank 30 or by any suitable driving mechanism.

In order to provide means to take up the slack in the belt or chain 22 when the same is used on any of the smaller pulleys, a take-up sheave or pulley 25 may be mounted upon an arm 26, secured to the leg or standard 27 of a receiving-table 28, or said take-up sheave or pulley may be mounted in any other convenient manner.

The wings or blades 19 may be curved or spirally formed, substantially as shown at 29 in Fig. 4, if preferred. The bottom of the trough is formed with the tapered ribs $28^a$ or the like, as seen in Fig. 1.

The operation of the invention will be readily understood from the foregoing description when taken in connection with the accompanying drawings and the following explanation thereof. The fruit is placed upon the hopper, which causes it to gravitate toward the feeding device over the gate 10 when the latter is down or in a plane substantially the same as that of the hopper-bottom to the feeding device, which is rotated by the band or chain 22, passing over the driving-pulley or sprocket-wheel 23 and the pulley 21, and when thus rotated the feeding device picks up and conveys the fruit slowly, by means of the blades or wings 19 thereof, to the farther portion of the apparatus, as will be readily understood.

By increasing the number of blades or wings 19 the quantity of fruit conveyed by the feeding apparatus can be increased, or by putting the band or chain 22 on the smaller pulleys the rapidity of the feeding device can be increased.

It is not desired to confine this invention to the specific construction, combination, and arrangement of parts herein shown and described, and the right is reserved to make all such changes in and modifications of the same as may come within the spirit and scope of the invention.

I claim—

1. In a fruit cleaning and feeding device, a hopper having a portion of the bottom intermediate of the ends thereof barred or slatted longitudinally to permit the extraneous matter, to pass through the hopper, the bottom of the hopper having a portion thereof cut away at one end, a gate pivoted to the sides of the hopper near one end of the same, the said gate forming a covering for the cut-away portion of the bottom of the hopper near said end thereof, which permits the passage of the fruit through the hopper in combination with a rotary feeding device located at the end of the hopper beyond said gate, and a trough beyond said feeding device.

2. A fruit-cleaning device comprising a hopper having a cut-out portion in the bottom near the center thereof covered with bars or rods to permit the extraneous matter to pass through the hopper, a portion of the bottom of the hopper cut away at one end thereof, a gate pivoted to the sides of the hopper within the said cut-away portion, means for elevating and lowering the gate, the said gate when in the same plane with the bottom of the hopper permitting the fruit to pass through the hopper, and when elevated above the plane of the bottom of the hopper, prevents the fruit from passing therethrough and a rotary feeding device beyond and adjacent said gate.

3. In a fruit-feeding device, a hopper cut away at the bottom at one end and provided with bearings inserted through the sides thereof, a shaft extending across the end of the hopper, adapted to revolve in said bearings, castings keyed upon said shaft within the hopper, said castings having pairs of radial flanges made a part thereof, between which flanges the feeding wings or blades are inserted and held therebetween, the feeding wings or blades, cone-pulleys fixed to said shaft, and means for revolving the pulley and shaft at different rates of speed, and a gate pivoted in said cut-away portion of the hopper between the feeding device and the feeding end of said hopper.

In testimony whereof I have signed my name to this specification in the presence of two subscribing witnesses.

IRVING H. FAY.

Witnesses:
 AMELIA GUEST,
 L. B. ALDERETE.